(12) United States Patent
Song et al.

(10) Patent No.: US 12,390,988 B2
(45) Date of Patent: Aug. 19, 2025

(54) 3D PRINTER

(71) Applicant: CARIMA CO., LTD., Seoul (KR)

(72) Inventors: Sung-eun Song, Seoul (KR); Hyeon-soo Cho, Seoul (KR); Kwang-min Lee, Seoul (KR)

(73) Assignee: CARIMA CO., LTD., Seoul (KR)

(*) Notice: Subject to any disclaimer, the term of this patent is extended or adjusted under 35 U.S.C. 154(b) by 158 days.

(21) Appl. No.: 17/799,116

(22) PCT Filed: Feb. 5, 2021

(86) PCT No.: PCT/KR2021/001585
§ 371 (c)(1),
(2) Date: Aug. 11, 2022

(87) PCT Pub. No.: WO2021/162365
PCT Pub. Date: Aug. 19, 2021

(65) Prior Publication Data
US 2023/0032761 A1 Feb. 2, 2023

(30) Foreign Application Priority Data

Feb. 11, 2020 (KR) .................. 10-2020-0016265
Jan. 29, 2021 (KR) .................. 10-2021-0012881

(51) Int. Cl.
*B29C 64/264* (2017.01)
*B29C 64/135* (2017.01)
(Continued)

(52) U.S. Cl.
CPC .......... *B29C 64/135* (2017.08); *B29C 64/232* (2017.08); *B29C 64/245* (2017.08);
(Continued)

(58) Field of Classification Search
CPC .................................................. B29C 64/264
See application file for complete search history.

(56) References Cited

U.S. PATENT DOCUMENTS 3,706,486 A * 12/1972 de Montebello ...... G03B 35/24
359/620
2008/0174877 A1  7/2008 Chung
(Continued)

FOREIGN PATENT DOCUMENTS

CN  110524874 A * 12/2019 ........... B29C 64/129
JP  2015-171820 A  10/2015
(Continued)

OTHER PUBLICATIONS

Machine translation of CN 110524874, retrieved from USPTO database Jun. 21, 2024 (Year: 2024).*

(Continued)

*Primary Examiner* — Timothy Kennedy
(74) *Attorney, Agent, or Firm* — Sughrue Mion, PLLC

(57) ABSTRACT

A 3D printer according to an embodiment of the disclosure includes: a resin tank accommodating a resin material; a molding plate movable up and down in the resin tank, and supporting a printed object formed by stacking a plurality of unit forming layers in sequence; an up-and-down movement actuator actuating at least one of the resin tank and the molding plate to move up and down; an exposure unit emitting light toward the molding plate; and a lens sheet including a first material layer including a molding surface facing the molding plate and a light receiving surface facing the exposure unit, disposed between the molding plate and the exposure unit, formed with a plurality of fine lens units for converging and diffusing the light from the exposure unit on one surface, and having a high refractive index, and a second material layer including a concavo-convex portion to be engaged with the fine lens unit of the first material layer, and having a low refractive index.

5 Claims, 7 Drawing Sheets

(51) Int. Cl.
  *B29C 64/232* (2017.01)
  *B29C 64/245* (2017.01)
  *B29C 64/255* (2017.01)
  *B33Y 10/00* (2015.01)
  *B33Y 30/00* (2015.01)

(52) U.S. Cl.
  CPC .......... *B29C 64/255* (2017.08); *B29C 64/264* (2017.08); *B33Y 10/00* (2014.12); *B33Y 30/00* (2014.12)

(56) References Cited

U.S. PATENT DOCUMENTS

| | | | |
|---|---|---|---|
| 2010/0320648 A1* | 12/2010 | Jamar | B29C 64/129 264/401 |
| 2012/0057143 A1* | 3/2012 | Jamar | G03F 7/70391 355/67 |
| 2013/0295215 A1* | 11/2013 | Wu | B29C 64/112 425/174.4 |
| 2018/0126663 A1 | 5/2018 | Jun et al. | |
| 2019/0111622 A1* | 4/2019 | Khalip | B29C 64/268 |

FOREIGN PATENT DOCUMENTS

| | | |
|---|---|---|
| KR | 10-0841438 B1 | 6/2008 |
| KR | 10-2011-0053010 A | 5/2011 |
| KR | 10-2016-0113062 A | 9/2016 |
| WO | 2006/074812 A2 | 7/2006 |

OTHER PUBLICATIONS

International Search Report for PCT/KR2021/001585 dated Jul. 26, 2021.
Korean Office Action for Korean Application No. 10-2021-0012881 dated Sep. 13, 2021, 8 pages.

\* cited by examiner

3D PRINTER

CROSS REFERENCE TO RELATED APPLICATIONS

This application is a National Stage of International Application No. PCT/KR2021/001585 filed Feb. 5, 2021, claiming priority based on Korean Patent Application No. 10-2020-0016265 filed Feb. 11, 2020 and Korean Patent Application No. 10-2021-0012881 filed Jan. 29, 2021.

TECHNICAL FIELD

The disclosure relates to a 3D printer, and more particularly to a 3D printer which can form a printed object as a photocurable resin material is additively constructed through exposure and curing.

BACKGROUND ART

A digital light processing (DLP) type 3D printer constructs a desired 3D printed object by curing a photocurable resin material on a molding surface in a resin tank storing the resin material, and additively constructing the resin material in sequence on a molding plate. The 3D printer needs a process of separating the 3D printed object cured and additively constructed on the molding plate from the molding surface in order to additively construct the next unit forming layer every time when the unit forming layer is additively constructed on the molding plate.

Although a continuous additive-construction method is used instead of an intermittent additive-construction method by which every unit forming layer is completely separated and additively constructed, a space is required for the construction to fill the resin material between the molding surface and the molding plate.

Further, it is relatively easy to separate the 3D printed object from the cured surface when the surface area of the cured unit forming layer is small, but it is not easy to separate the 3D printed object when the surface area of the cured unit forming layer is large.

As a method of improving this, oxygen or a release agent may for example be used in separating the printed object from the molding surface. However, in the case of using oxygen or the release agent, sloshing occurs when the molding plate moves up and down with respect to the resin tank, and thus there are problems in that the speed of printing is very slow because the printing should be carried out after the sloshing is stabilized, and the printing has poor quality when the speed of printing is increased.

DISCLOSURE

Technical Problem

Accordingly, an aspect of the disclosure is to provide a 3D printer which can improve the quality of printing while increasing the speed of printing.

Technical Solution

According to an embodiment of the disclosure, 3D printer includes: a resin tank accommodating a resin material; a molding plate movable up and down in the resin tank, and supporting a printed object formed by stacking a plurality of unit forming layers in sequence; an up-and-down movement actuator actuating at least one of the resin tank and the molding plate to move up and down; an exposure unit emitting light toward the molding plate; and a lens sheet including a first material layer including a molding surface facing the molding plate and a light receiving surface facing the exposure unit, disposed between the molding plate and the exposure unit, formed with a plurality of fine lens units for converging and diffusing the light from the exposure unit on one surface, and having a high refractive index, and a second material layer including a concavo-convex portion to be engaged with the fine lens unit of the first material layer, and having a low refractive index.

The fine lens unit may be formed to make the light formed on the molding surface have an area within a predefined range.

The fine lens unit may protrude being shaped like a convex lens on one surface of the first material layer.

According to an embodiment of the disclosure, the 3D printer further includes a controller configured to: control the exposure unit to emit light corresponding to an image of the unit forming layer, and control the up-and-down movement actuator to move the molding plate up to be spaced apart from the lens unit while the exposure unit emits light.

According to an embodiment of the disclosure, a method of manufacturing a lens sheet for minimizing a curing surface area of a unit forming layer includes: forming a second material layer with a concavo-convex portion by pressing a sheet against a mold on which a plurality of fine lens patterns is embossed; preparing a transparent material by mixing a coating agent and a curing agent; and forming a first material layer with a fine lens unit by evenly applying the mixed transparent material to the concavo-convex portion of the second material layer and curing the applied mixed transparent material According to an embodiment of the disclosure, a method of manufacturing a lens sheet for minimizing a curing surface area of a unit forming layer includes: forming a first material layer with a fine lens unit by pressing a sheet against a mold on which a plurality of fine lens patterns is engraved; preparing a transparent material by mixing a coating agent and a curing agent; and forming a second material layer with a concavo-convex portion by evenly applying the mixed transparent material to the fine lens unit of the first material layer and curing the applied mixed transparent material.

Advantageous Effects

According to the disclosure, light from an exposure unit is refracted by a lens sheet to have the minimum area on a molding surface, thereby improving the quality of printing while increasing the speed of printing.

MODE FOR INVENTION

Below, a 3D printer 1 according to embodiments of the disclosure will be described in detail with reference to the accompanying drawings.

Figure 1:
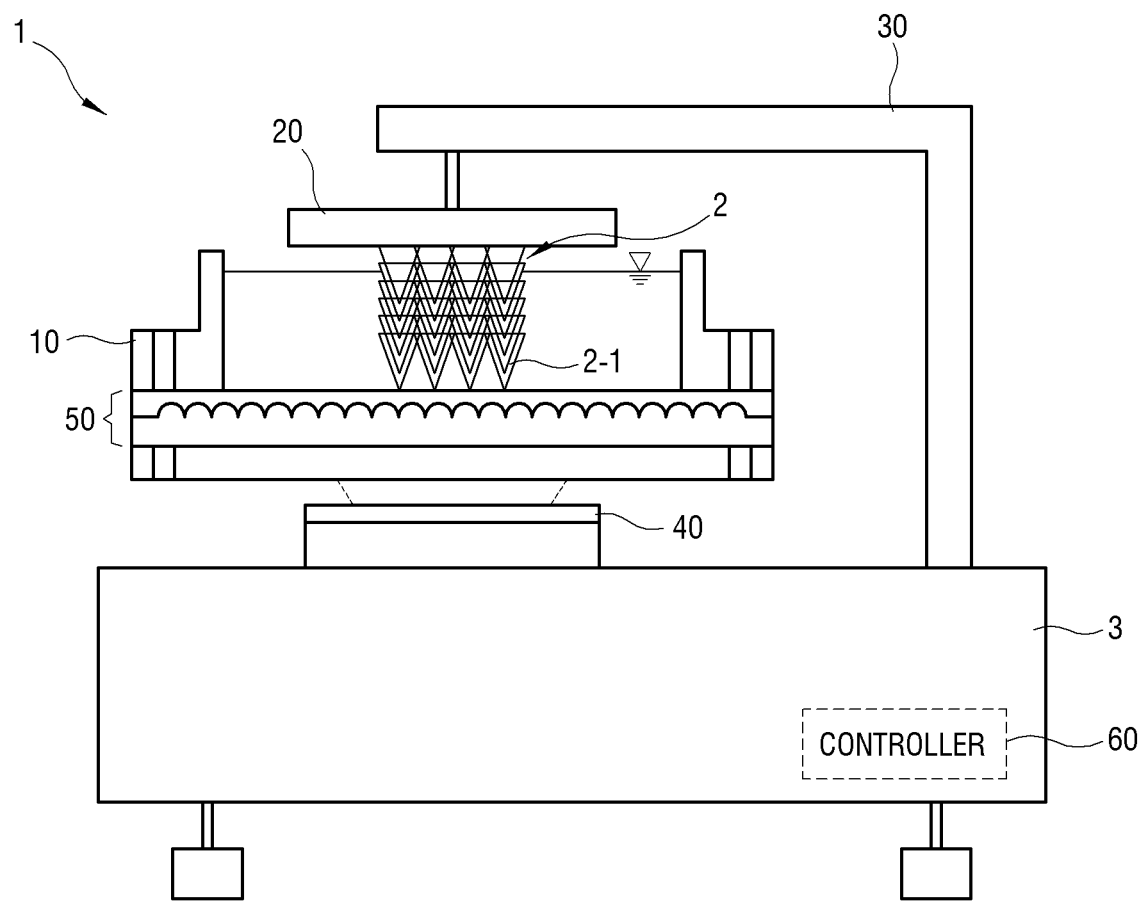
FIG. 1 is a view for explaining a 3D printer according to an embodiment of the disclosure.

FIG. 1 is a view for explaining a 3D printer according to an embodiment of the disclosure.

The 3D printer 1 includes a resin tank 10, a molding plate 20, an up-and-down movement actuator 30, an exposure unit 40, a lens sheet 50, and a controller 60.

The disclosure will be described based on a bottom-up 3D printer 1 in which additive construction is performed while the molding plate 20 is moving up in the resin tank 10 as shown in FIG. 1, but may also be applied to a top-down 3D printer in which additive construction is performed while the molding plate is moving down. Likewise, the disclosure will be described based on a resin tank type, but is not limited to the 3D printer 1 of the resin tank type.

The resin tank 10 stores a photocurable resin material, and has an opened top and a transparent bottom. In this case, the resin tank 10 is divided into an upper frame and a lower frame as shown in FIG. 1, in which the upper frame is coupled to the lens sheet 50 to form a storage space for accommodating the resin material, and the lower frame is coupled to and support it. In this case, a protrusion may be formed on the bottom of the upper frame in order to easily fix the lens sheet 50, and the protrusion has an effect on increasing tension on the surface of the lens sheet 50 made of a material having an elongation rate.

In the case of using a structure in which the resin tank 10 is divided into the upper frame and the lower frame, a sealing material may be added to prevent the resin material accommodated in the resin tank 10 from leaking out.

However, the resin tank 10 is not limited to this structure, but may have various structures. For example, the resin tank may be shaped like an integrated tank having a transparent bottom and the lens sheet 50 is coated or put on the bottom.

The molding plate 20 is movable up and down inside the resin tank 10 by the up-and-down movement actuator 30, and is shaped like a plate to support a printed object 2 printed as a plurality of unit forming layers 2-1 is gradually and additively constructed.

The up-and-down movement actuator 30 makes at least one of the resin tank 10 and the molding plate 20 move up and down. The up-and-down movement actuator 30 includes an elevating rail, and an elevating motor for moving the elevating rail up and down. The elevating rail is coupled supporting at least one of the resin tank 10 and the molding plate 20.

The exposure unit 40 is disposed under the resin tank 10 and emits ultraviolet light for curing the photocurable resin material in an upward direction toward a light receiving surface of the lens sheet 50.

The lens sheet 50 is disposed between the molding plate 20 and the exposure unit 40, and the light emitted from the exposure unit 40 passes through the lens sheet 50 and cures the resin material on the molding surface. In this case, the lens sheet 50 refracts the light emitted from the exposure unit 40 so as to minimize an exposure area where the cured resin material is in contact with the molding surface of the lens sheet 50, thereby guiding the unit forming layers 2-1 to be exposed to the light in an additive constructing direction. More detailed descriptions about the lens sheet 50 will be made with reference to FIGS. 2 and 3.

The controller 60 controls the exposure unit 40 to emit light corresponding to an image of the unit forming layer 2-1, and controls the up-and-down movement actuator 30 to move the molding plate 20 up to be spaced apart from the lens sheet 50. The controller 60 may control the exposure unit 40 and the up-and-down movement actuator 30 sequentially or simultaneously according to constructing methods of the 3D printer 1.

Figure 2:
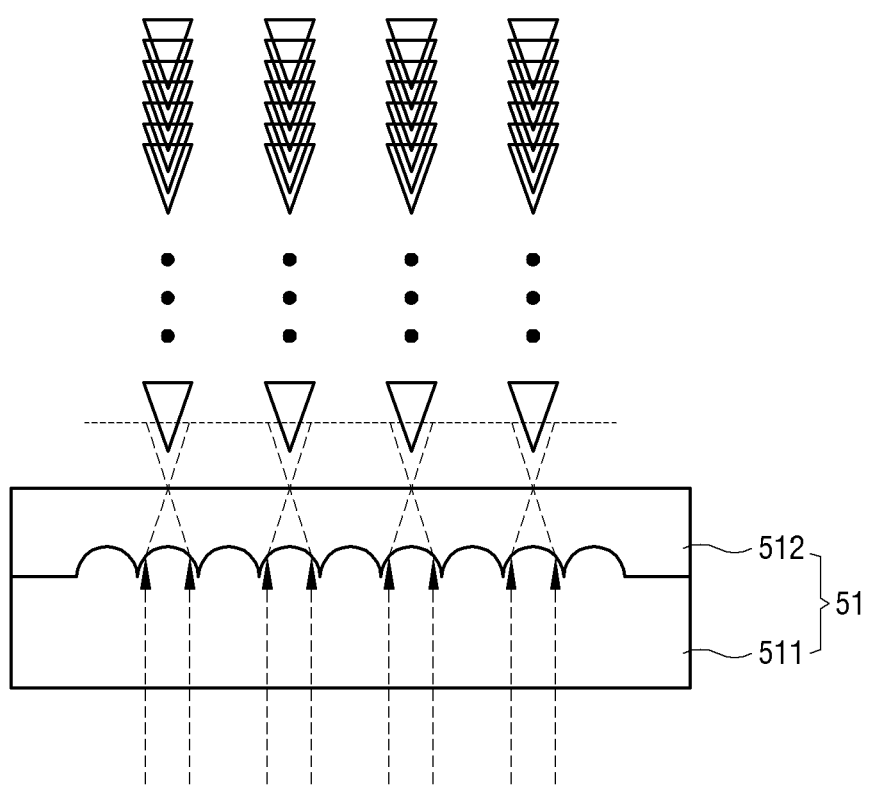
FIG. 2 is a view for explaining a lens sheet according to an embodiment of the disclosure.

FIG. 2 is a view for explaining a lens sheet according to an embodiment of the disclosure.

FIG. 2 shows a first lens sheet 51 as an example of the lens sheet 50 of FIG. 1. The first lens sheet 51 is based on combination of a first material layer 511 having a high refractive index and a second material layer 512 having a low refractive index, which are made of different materials. The first lens sheet 51 has the molding surface facing the molding plate 20 and the light receiving surface facing the exposure unit 40.

The first material layer 511 of the first lens sheet 51 includes a plurality of fine lens units formed on the molding surface and converging and diffusing the light emitted from the exposure unit 40. The second material layer 512 of the first lens sheet 51 includes a concavo-convex portion to be engaged with the fine lens units formed on the first material layer 511.

The controller 60 controls the exposure unit 40 to emit light corresponding to an image of each unit forming layer 2-1, and the emitted light passes through the first lens sheet 51 and cures the resin material on the molding surface.

Here, the travel path of the emitted light in the first lens sheet 51 will be described. The light emitted from the exposure unit 40 passes through the fine lens units of the first material layer 511 via the light receiving surface of the first lens sheet 51, and is refracted by difference in the refractive index between the first material layer 511 and the second material layer 512 while entering the second material layer 512. The refracted light converges and diffuses on the molding surface of the first lens sheet 51. The diffused light has an inverted pyramid shape as shown therein, and the resin material in the resin tank 10 is cured along the inverted pyramid shape. In the first lens sheet 51, the first material layer 511 has a higher refractive index than the second material layer 512.

Therefore, the fine lens unit of the first material layer 511 protrudes from the surface of the first material layer 511 while being shaped like a convex lens so as to serve as the convex lens.

The light refracted in the fine lens unit converges and diffuses on the molding surface. At this time, the surface area of the resin to be cured is varied depending on the surface area of the light formed on the molding surface, and it is therefore preferable that the vertex of the inverted pyramid is cured on the molding surface in order to minimize the surface area of the resin to be adhered to the molding surface. However, the fine lens unit according to the disclosure is formed to make the area of the light formed on the molding surface be within a predefined range even though some errors may occur due to the difference in the refractive index between the second material layer 512 and the first material layer 511, the lens curvature of the fine lens unit, etc.

On the other hand, the second material layer 512 includes the concavo-convex portion formed having recessed shapes and engaged with the fine lens units formed on the first material layer 511. One of the first material layer 511 or the second material layer 512 has physical properties to minimize deformation due to external force. For example, the first material layer 511 may be thicker 10 times than the second material layer 512, and may be made of a material having low strain per unit area. As the first material layer 511 and the second material layer 512 are engaged with and coupled to each other, the fine lens units are less deformed even though the molding plate 20 is moved during a printing process, and thus stable printing is possible.

Unlike a manner in which one surface of the unit forming layer is cured having the same shape on the molding surface, a manner according to the disclosure in which the exposure is performed in the form of the inverted pyramid minimizes the area of the cured surface of the resin material being in contact with the molding surface into an area corresponding to the vertex of the inverted pyramid, thereby making it easy to separate the printed object from the molding surface, minimizing a phenomenon that the first lens sheet 51 is partially lifted, and minimizing the shaking of the resin tank 10 even though the molding plate 20 is moved up and down. As the shaking of the resin tank 10 is minimized, shock or vibration is significantly reduced while the printed object is additively constructed and the molding plate 20 is moved up and down, thereby increasing the quality of the printed object.

Further, the first lens sheet 51 is formed by completely coupling the first material layer 511 and the second material layer 512, and it is therefore possible to prevent the fine lens units of the first material layer 511 from being deformed even when the first lens sheet 51 is partially lifted as the printed object is adhered to the first lens sheet 51 when the molding plate 20 is moved up and down, thereby minimizing change in the travel path of the light. Thus, focal distances at which the light passing through the fine lens units converges are uniformly maintained, thereby carrying out stable printing, preventing non-uniform printing due to different points in time at which proper exposure is completed, and improving printing quality.

Figure 3:
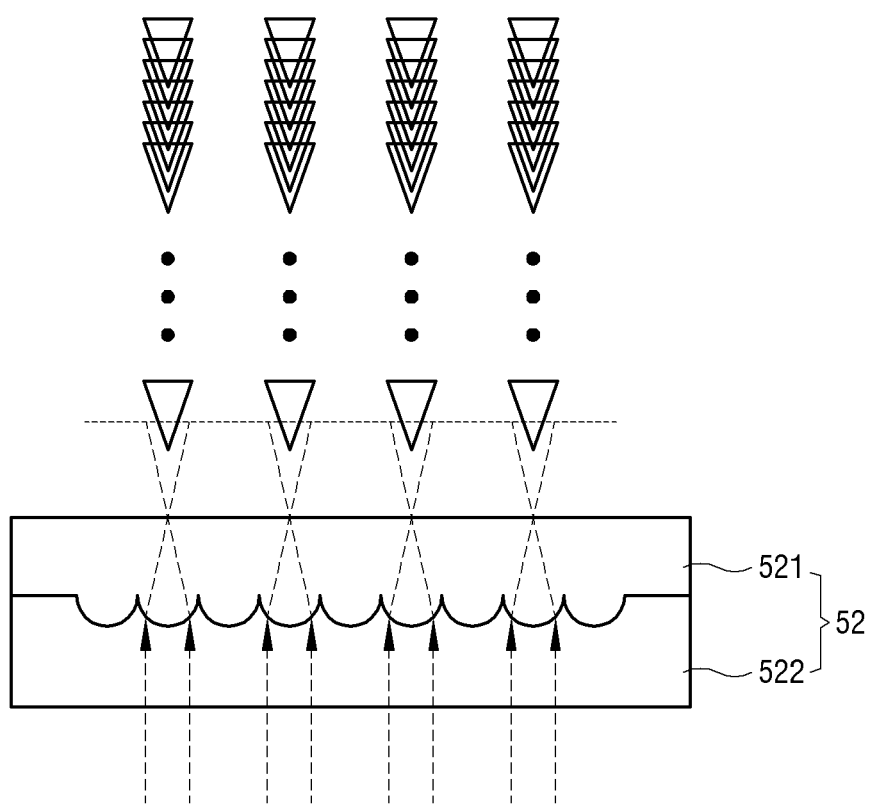
FIG. 3 is a view for explaining a lens sheet according to another embodiment of the disclosure.

FIG. 3 is a view for explaining a lens sheet according to another embodiment of the disclosure. FIG. 3 shows a second lens sheet 52 as an alternative example to the lens sheet 50 of FIG. 1. In FIG. 3, descriptions will be made focusing difference from FIG. 2.

FIG. 2 shows that the fine lens units of the first material layer 511 are convexly formed facing upward, and the second material layer 512 is formed on the first material layer 511. Likewise, FIG. 3 shows that the second lens sheet 52 is based on combination of a first material layer 521 having a high refractive index and a second material layer 522 having a low refractive index, but the fine lens units of the first material layer 521 are convexly formed facing downward and the second material layer 522 is formed beneath the first material layer 521 unlike the first lens sheet 51. Like the first lens sheet 51, the second material layer 522 of the second lens sheet 52 includes a concavo-convex portion having a recessed shape and engaged with the fine lens units of the first material layer 521.

Two travel paths of the light passing through the first and second lens sheets 51 and 52 respectively shown in FIGS. 2 and 3 are consequently the same, thereby having the same effect. However, the travel paths may be varied depending on the refractive indexes of the materials of the first material layers 511 and 521 and the second material layers 512 and 522.

Below, the travel path of the emitted light in the second lens sheet 52 shown in FIG. 3 will be described. The light emitted from the exposure unit 40 passes through the second material layer 512, and is refracted by difference in the refractive index between the second material layer 522 and the first material layer 521 while entering the fine lens units of the first material layer 521. The refracted light converges and diffuses on the molding surface of the second lens sheet 52. The diffused light has an inverted pyramid shape as shown therein, and the resin material in the resin tank 10 is cured along the inverted pyramid shape. In the first lens sheet 51, the first material layer 511 has a higher refractive index than the second material layer 512.

Therefore, the fine lens unit of the first material layer 521 protrudes from the surface of the first material layer 521 while being shaped like a convex lens so as to serve as the convex lens. Likewise, the first material layer 521 has a higher refractive index than the second material layer 522.

According to an embodiment of the disclosure, sheets different in material from each other are used to form the fine lens units, and therefore the structure of the lens sheet is not limited so that the second lens sheet 52 can serve as a lens according to the materials for the sheets and have the effects according to the disclosure.

Figure 4:
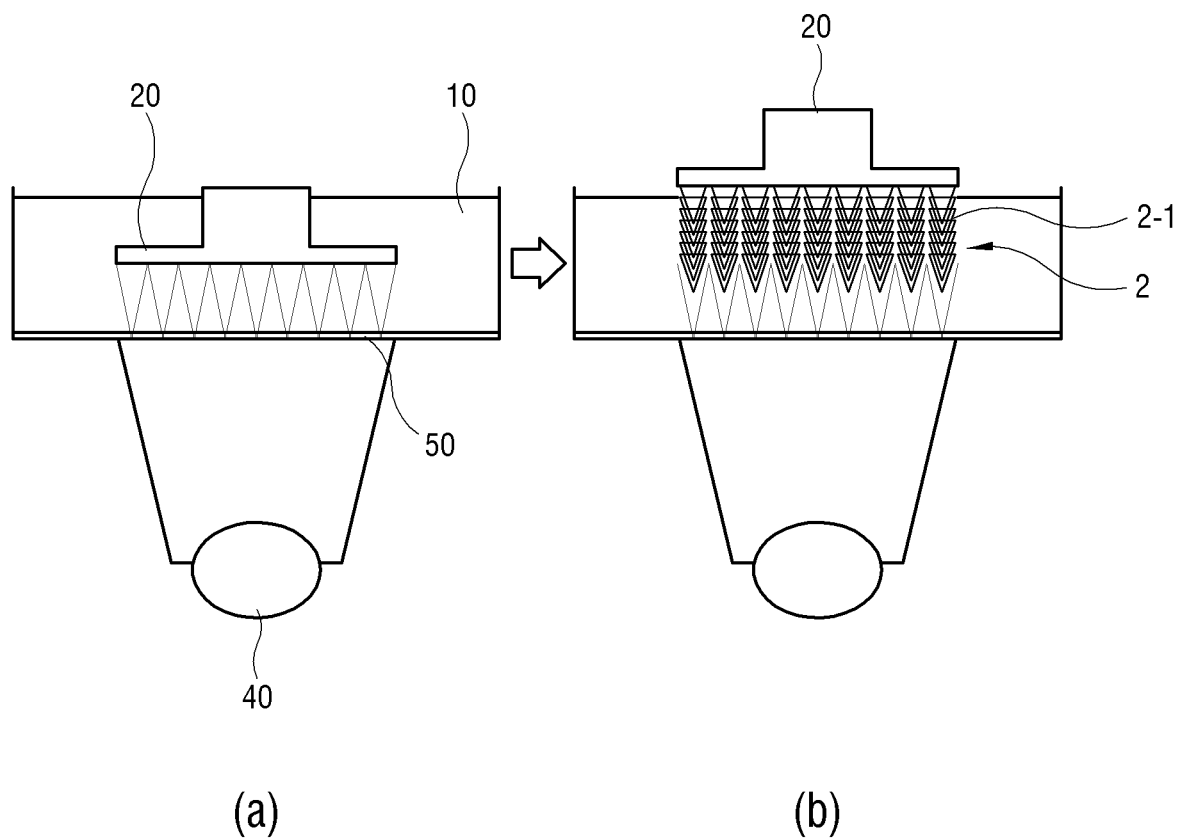
FIG. 4 is a view showing an operation of a 3D printer according to an embodiment of the disclosure.

FIG. 4 is a view showing an operation of a 3D printer according to an embodiment of the disclosure.

Referring to (a) of FIG. 4, the light emitted from the exposure unit 40 is refracted by the fine lens units of the lens sheet 50 and illuminates the molding plate 20. In this case, the light refracted by the plurality of fine lens units has the minimum area on the molding surface of the lens sheet 50 and is then refracted to become wider, thereby illuminating the resin material disposed between the molding plate 20 and the molding surface.

Referring to (b) of FIG. 4, when the molding plate 20 is moved up by the up-and-down movement actuator 30 while the light is being emitted from the exposure unit 40 toward the molding plate 20, the photocurable resin material is continuously filled between the molding surface of the lens sheet 50 and the molding plate 20, thereby continuously and additively constructing the unit forming layers 2-1. Because the molding plate 20 moves up while the light is emitted in the form of the inverted pyramid, a plurality of inverted pyramid layers are continuously stacked to overlap in such manner that one inverted pyramid layer is partially cured and then an upper layer is additionally cured while the next inverted pyramid layer is partially cured in succession.

With the foregoing 3D printer 1, the light emitted from the exposure unit 40 is refracted by the lens sheet 50 and performs curing while forming the minimum area on the molding surface of the lens sheet 50, so that the unit printed object cured as the molding plate moves up can have the minimum resistance to release. Therefore, according to the disclosure, a 3D printed object with high quality is continuously and rapidly manufactured without interruption even though special mechanical solutions are not used.

Figure 5:
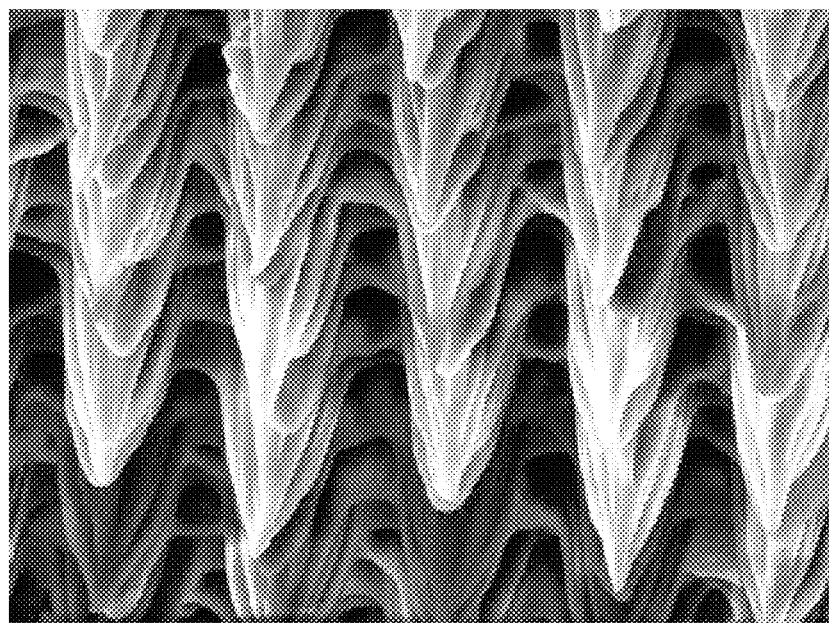
FIG. 5 is a scanning electron microscope (SEM) image of a printed object additively constructed by a 3D printer according to an embodiment of the disclosure.

FIG. 5 is a scanning electron microscope (SEM) image of a printed object additively constructed by a 3D printer according to an embodiment of the disclosure. As described above with reference to FIGS. 2 to 4, the light emitted from the exposure unit 40 is refracted while passing through the lens sheet 50, and converges and diffuses on the molding surface of the lens sheet 50. The light is diffused in the form of the inverted pyramid, and the resin material in the resin tank 10 is cured along the shapes of the diffused light. Therefore, the unit forming layers 2-1 are cured in the form of the inverted pyramid and additively constructed, and the SEM image obtained by photographing the surface of the printed object showed that the unit forming layers were stacked as described above.

Figure 6:
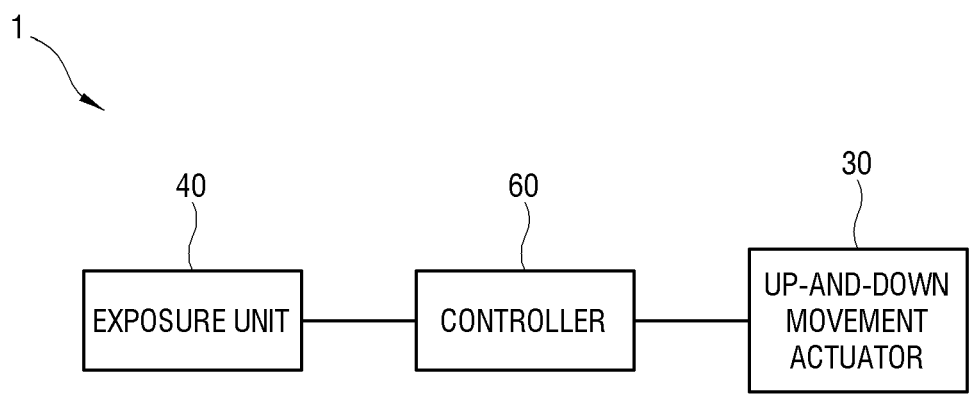
FIG. 6 is a control block diagram of a 3D printer according to the disclosure.

FIG. 6 is a control block diagram of a 3D printer according to the disclosure. The controller 60 controls the exposure unit 40 to emit light corresponding to an image of each unit forming layer based on image data obtained by dividing the printed object into the unit forming layers, and controls the up-and-down movement actuator 30 to move the molding plate 20 up or down.

Figure 7:
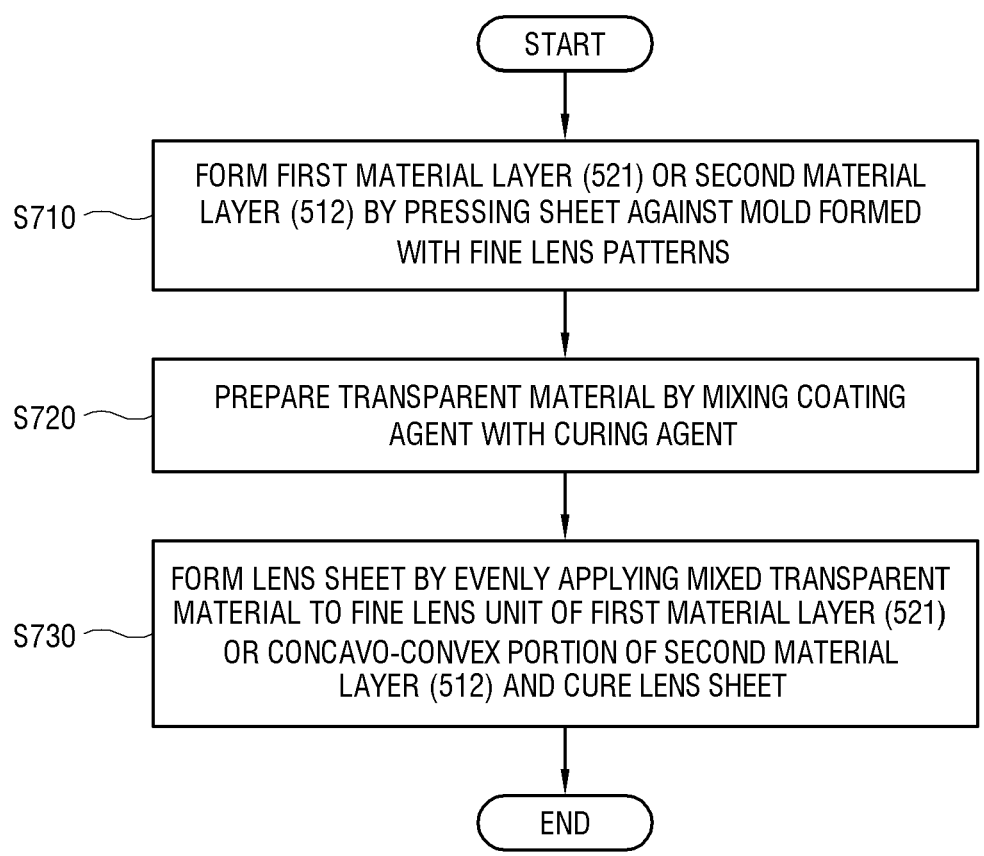
FIG. 7 is a flowchart showing a method of manufacturing a lens sheet according to an embodiment of the disclosure.

FIG. 7 is a flowchart showing a method of manufacturing the first lens sheet 51 shown in FIG. 2 and the second lens sheet 52 shown in FIG. 3.

According to an embodiment of the disclosure, the second material layer 512 of FIG. 2 or the first material layer 521 of FIG. 3 is formed by pressing a sheet against a mold formed with a plurality of fine lens patterns (S710).

The sheet refers to a film having an elongation rate and made of a material easily formed when pressed against a mold, and the material may have high releasability when forming the molding surface like one surface of the second material layer 512 of FIG. 2 or one surface of the first material layer 521 of FIG. 3. Further, the sheet needs to have properties that transmits light well. For example, the sheet may include fluorinated ethylene propylene (FEP), perfluoroalkoxy alkanes (PFA), ethylene tetra fluoro ethylene (ETFE), poly tetra fluoro ethylene (PTFE), etc.

The mold may be made of nickel or the like metal material, and the plurality of fine lens patterns are engraved or embossed thereon. For example, when the sheet is pressed against the embossed mold, the concavo-convex portion is engraved like the second material layer 512 as shown in FIG. 2.

Further, when the sheet is pressed against the engraved mold, the concavo-convex portion is embossed like the first material layer 521 as shown in FIG. 3. Meanwhile, like the first material layer 521 of FIG. 3 may be made of a material excellent in releasability. Alternatively, a third material layer (not shown) excellent in releasability may be formed on the molding surface of the first material layer 521.

The sheet may have a thickness of 200 μm to 500 μm. When the thickness of the sheet is smaller than 200 μm, the sheet is likely to tear or is not properly formed with the fine lens units when the sheet is pressed against the mold. When the thickness of the sheet is greater than 500 μm, the focal distance is so long that the light cannot reach the molding surface, and it is difficult to expect the effects according to the disclosure.

According to an embodiment of the disclosure, a transparent material is prepared by mixing a curing agent with a coating agent (S720).

The coating agent is made of a silicone material, and its fluidity is controllable so that the coating agent itself or the coating agent mixed into the transparent material can have fluidity, thereby being cured after a predetermined period of time elapses after being coated on the sheet. Silicone oil (polymeric organosilicon compounds) of polydimethylsiloxane (PDMS) may be representatively used as the coating agent, and may be replaced with any material as long as it is a transparent and inert material among silicon-based organic polymers. The curing agent helps the transparent material to be more easily cured when applied to the sheet.

Further, the refractive index of the transparent material may be adjusted according to ratios of the coating agent and the curing agent. According to the disclosure, the fine lens units are formed on a layer having a higher refractive index. Therefore, the transparent material is used as materials for the first material layer 511 of FIG. 2 and the second material layer 522 of FIG. 3, and its refractive index needs to be appropriately adjusted according to the materials.

In this case, a vacuum defoamer may be used to remove air bubbles from the transparent material so that the transparent material can be completely coupled without any space between the layer having the fine lens unit and the layer having the concavo-convex portion According to an embodiment of the disclosure, the mixed transparent material is evenly applied to the concavo-convex portion of the second material layer 512 of FIG. 2 or the fine lens unit of the first material layer 521 of FIG. 3, and then cured, thereby forming the first lens sheet 51 or the second lens sheet 52 (S730).

In FIG. 2, the transparent material is applied to the concavo-convex portion of the second material layer 512. In FIG. 3, the transparent material is applied to the fine lens unit of the first material layer 521.

After applying the transparent material, the transparent material is cured at room temperature for 1 to 2 days. The transparent material holds and supports the plurality of fine lens patterns formed in the sheet, thereby minimizing vibration, damage, focus shifting, etc., which may occur during a 3D printing process.

Referring to the 3D printer 1 shown in FIG. 2, the first lens sheet 51 is formed by combination of the second material layer 512 formed with the engraved concavo-convex portion by pressing the sheet against the mold, and the first material layer 511 formed with the fine lens unit by evenly applying the transparent material to the concavo-convex portion.

In FIG. 2, the first material layer 511 serves as a lens in the first lens sheet 51, and the first material layer 511 has a higher refractive index than the second material layer 512, so that the light can be refracted in the fine lens unit of the first material layer 511 and converge on the molding surface of the second material layer 512.

Likewise, referring to the 3D printer 1 shown in FIG. 3, the second lens sheet 52 is formed by combination of the first material layer 521 formed with the embossed fine lens unit by pressing the sheet against the mold, and the second material layer 522 formed with the concavo-convex portion by evenly applying the transparent material to the fine lens unit.

In FIG. 3, the first material layer 521 serves as a lens in the second lens sheet 52, and the first material layer 521 has a higher refractive index than the second material layer 522, so that the light can be refracted in the fine lens unit of the first material layer 521 and converge on the molding surface of the first material layer 521.

The invention claimed is:

1. A 3D printer comprising:
   a resin tank accommodating a resin material;
   a molding plate movable up and down in the resin tank, and supporting a printed object formed by stacking a plurality of unit forming layers in sequence;
   an up-and-down movement actuator actuating at least one of the resin tank and the molding plate to move up and down;
   an exposure unit emitting light toward the molding plate; and
   a lens sheet comprising:
   a first material layer comprising a molding surface facing the molding plate and a light receiving surface facing the exposure unit, disposed between the molding plate and the exposure unit, formed with a plurality of fine lens units for converging and diffusing the light from the exposure unit on one surface, and
   a second material layer comprising a concavo-convex portion to be engaged with the fine lens unit of the first material layer, wherein the first material layer has a higher refractive index than the second material layer,
wherein the first material layer is thicker than the second material layer, and
wherein in a state in which an external force is applied to at least of the first material layer or the second material layer, the first material layer is that is less deformable than the second material layer.

2. The 3D printer of claim 1, wherein the plurality of fine lens units is formed to make the light formed on the molding surface have an area within a predefined range such that an area of the molding surface, of which the light is formed, is minimized.

3. The 3D printer of claim 1, wherein the plurality of fine lens units protrude from one surface of the first material layer and are shaped like a convex lens.

4. The 3D printer of claim 1, further comprising a controller configured to:
   control the exposure unit to emit light corresponding to an image of the unit forming layer, and
   control the up-and-down movement actuator to move the molding plate up to be spaced apart from the lens unit while the exposure unit emits light.

5. The 3D printer of claim 1, wherein the wherein the first material layer is ten times thicker than the second material layer.

\* \* \* \* \*